(12) United States Patent
Isshiki et al.

(10) Patent No.: US 7,773,488 B2
(45) Date of Patent: Aug. 10, 2010

(54) INFORMATION REPRODUCING APPARATUS

(75) Inventors: Fumio Isshiki, Yokohama (JP); Hiromitsu Mori, Fujisawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 1201 days.

(21) Appl. No.: 11/362,023

(22) Filed: Feb. 27, 2006

(65) Prior Publication Data

US 2007/0121471 A1  May 31, 2007

(30) Foreign Application Priority Data

Nov. 30, 2005 (JP) .............................. 2005-345372

(51) Int. Cl.
*G11B 7/00* (2006.01)
(52) U.S. Cl. ............................. 369/112.02; 369/53.28
(58) Field of Classification Search .................. None
See application file for complete search history.

(56) References Cited

U.S. PATENT DOCUMENTS 5,978,328 A  11/1999 Tanaka 6,954,417 B2 * 10/2005 Komma et al. ......... 369/112.02
2005/0025000 A1 * 2/2005 Ariyoshi et al. .......... 369/44.32
2005/0094507 A1  5/2005 Ogasawara

FOREIGN PATENT DOCUMENTS

| JP | 09-115146 | 5/1997 |
| JP | 11-025467 | 1/1999 |
| JP | 2002-357804 | 12/2002 |
| JP | 2005-235326 | 9/2005 |

* cited by examiner

*Primary Examiner*—Lixi Chow
(74) *Attorney, Agent, or Firm*—Antonelli, Terry, Stout & Kraus, LLP.

(57) ABSTRACT

In an information reproducing apparatus in which a liquid crystal lens element is used for the selection and switching of layers, the instability of servo control during the switching of the layers due to the overlapping of signals from two layers is eliminated and the focal point is shifted onto the correct switched layer. During the switching of the liquid crystal lens, a focus bias is added depending on the direction in which the layers are switched so as to stabilize servo control. Alternatively, the objective lens is held during the switching and after the switching of the liquid crystal lens element, the hold state is released in synchronization with the rotation of the disk.

8 Claims, 11 Drawing Sheets

INFORMATION REPRODUCING APPARATUS

CLAIM OF PRIORITY

The present application claims priority from Japanese application JP 2005-345372 filed on Nov. 30, 2005, the content of which is hereby incorporated by reference into this application.

FIELD OF THE INVENTION

The present invention relates to an optical disk unit, an optical disk medium, and an optical information storage device for recording and reproducing information on a record medium using light. Particularly, it relates to a high-density optical disk utilizing blue light/violet light for reproducing information from a medium (a multilayer medium) provided with plural information layers, and to a multiple formats/standards-compatible information reproducing apparatus capable of playing back the aforementioned high-density optical disk.

BACKGROUND OF THE INVENTION

Optical recording media such as optical discs are becoming more and more multi-layered. As a result, the correction of spherical aberration caused by the difference in depth between layers read by an optical head (an optical pickup) has become a problem. In a conventional method of correcting such spherical aberration by the mechanical drive of a lens, the optical head is large-sized due to the mechanism for driving the lens. JP Patent Publication (Kokai) No. 2005-235326 A and JP Patent Publication (Kokai) No. 2002-357804 A, for example, propose optical heads in which the mechanism for driving the lens is omitted by electrically switching lens actions using a liquid crystal lens element in place of the mechanical drive, thereby reducing the size of the optical head.

JP Patent Publication (Kokai) Nos. 10-97720 A (1998), 11-25467 A (1999), and 2005-122862 A disclose objective lens position sensors. JP Patent Publication (Kokai) No. 9-115146 A (1997) discloses that a position sensor and a speed sensor are mounted on a focus actuator. However, none of these publications disclose the concrete structure of the sensors.

(Patent Document 1) JP Patent Publication (Kokai) No. 2005-235326 A (Patent Document 2) JP Patent Publication (Kokai) No. 2002-357804 A (Patent Document 3) JP Patent Publication (Kokai) No. 10-97720 A (1998)

(Patent Document 4) JP Patent Publication (Kokai) No. 11-25467 A (1999)

(Patent Document 5) JP Patent Publication (Kokai) No. 2005-122862 A (Patent Document 6) JP Patent Publication (Kokai) No. 9-115146 A (1997)

SUMMARY OF THE INVENTION

When a diffraction type of liquid crystal lens element as disclosed in JP Patent Publication (Kokai) No. 2002-357804 A, for example, is used as the liquid crystal lens element, the lens changes from an inactive state to an active state discontinuously. Hereafter, liquid crystal lens elements of the type that the amount of convergence/divergence discontinuously changes when the liquid crystal lens element is driven, including the diffraction type, are referred to as a switching-type liquid crystal lens element.

In such liquid crystal lens elements, the light (unaffected light) that has passed through the lens unaffected and the light (affected light) that has been converged/diverged by the lens coexist on the optical path during the switching, as shown in FIGS. 2A to 2C. For example, in FIG. 2B showing a halfway state of switching, the light that has passed through a liquid crystal lens element 18 consists of the light that has not been affected by the lens and the light that has been affected by the lens whose amounts change over time before they are focused on each of two layers in a record medium 8. Therefore, multiple focal points that are not quite focused could simultaneously exist in the plural information layers in the multilayer medium. As a result, a problem has arisen that the lights with two focal points are mixed in a photodetector unit for detecting the amount of focal error by detecting differences in the amount of light returning from the information recording medium, thereby destabilizing the focusing servo and tracking servo.

Concretely, as shown in FIGS. 2a to 2c showing examples of a change of an S-curve signal, a focal error signal of a first layer (a first-layer S-curve signal 4) and a focal error signal of a second layer (a second-layer S-curve signal 5) are mixed, and the signal amounts from the two focuses change as time goes. In FIG. 2, the horizontal axis shows the objective lens height H and the vertical axis shows a focal error signal FE. Therefore, in case a focus target point 6 is located on the first-layer S-curve signal, servo loses track if the first-layer S-curve signal vanishes because of the switching of the liquid crystal lens element (see FIG. 2c). Furthermore, in case the intervals between the layers have an error because of the manufacturing tolerance of the disk, the distance between the first- and second-layer S-curve signals is narrowed and the two signals overlap, thereby destabilizing the servo control during a switching.

When the correction is conventionally made by the mechanical drive of a lens, the above-mentioned problem of the liquid crystal lens element does not occur because the amounts of convergence/divergence gradually and continuously change in accordance with the change in the position of the correcting lens. In optical information reproducing apparatus using a rotary information recording medium in particular, new problems have arisen that, when servo control becomes unstable, the recording medium and the objective lens of the optical head collide because of the uneven rotation of the recording medium, resulting in the inability to read the information recorded on the medium due to scratches or the deterioration of the focusing characteristics of the objective lens.

As described above, there is the problem of how to stabilize servo control and how to control the objective lens in the optical head using the liquid crystal lens element during the switching of the liquid crystal lens.

(Definition of Terms)

In the following description, the element in which the lens action is switched by changing the voltage applied to a liquid crystal is referred to as a liquid crystal lens element or simply liquid crystal lens. Particularly, the switching type liquid crystal lens element is also referred to as a discontinuously switched-type lens element.

The amount of focal error is also referred to as a focal error amount.

Focus position control is also referred to as focusing servo. Tracking control is also referred to as tracking servo.

A detection signal of the amount of focal error for automatic focusing control is also referred to as a focal error signal or an FE signal. A scanned and detected (graphed or plotted) change of an FE signal corresponding to the amount of focal error is also referred to as an S-curve signal (or an S curve).

Displacing the target position of focus during focal position control is referred as giving a focal offset or a focal bias, or giving a bias to the target position. The direction in which the focal position changes when the voltage (or voltage waveform) applied to the liquid crystal lens is changed is also referred to as the focal point switching direction.

The light that has been reflected and returned after an information recording medium was irradiated therewith is also referred to as return light.

A readout signal proportional to the amount of return light for decoding is also referred to as an RF signal having radio-frequency components for decoding.

In this application, the term "optical information reproducing apparatus" refers to not only apparatuses for optical information reproduction, but also the optical pickup units that are equivalent to the optical head.

(Solution)

In this invention, to enhance the stability of servo control over an objective lens during the switching of a liquid crystal lens element in an optical information reproducing apparatus using the liquid crystal lens element, the procedure for the switching and a servo circuit for it are particularly arranged so as to enable the use of a liquid crystal lens element in the optical head of an optical disk unit and to provide a reliable and small-sized optical disk unit.

The optical disk unit according to one embodiment of the invention includes means for applying a focus bias during the switching of the liquid crystal lens depending on the direction of switching. Heretofore, a problem has arisen that control was made unstable by the disappearance of the S-curve signal from the layer to which servo control was applied during switching, resulting in the focus servo losing track. Thus, in accordance with the present invention, the direction in which the focal point is shifted during the disappearance of the S-curve signal is determined by applying a focus bias even while servo control is continued, thereby allowing the focal position to be correctly shifted to the layer to be switched to.

In another embodiment of the optical disk unit according to the invention, servo control is switched to that based on the lens position detected by an objective lens position sensor during the switching of the liquid crystal lens element, and the lens position is fixed ("held"). After the switching of the liquid crystal lens is completed, the S-curve signal (an FE signal) of a switched layer is detected to be exceeding a threshold, the servo control depending upon the lens position is released and normal servo control is restored. Heretofore, a problem has arisen that servo control was turned unstable and did not function because two S-curve signals overlapped and a correct S-curve waveform could not be acquired during the switching of the liquid crystal lens element. Then, in this invention, control is stabilized by fixing the position of the lens during switching and restoring original servo control after a correct S-curve signal can be detected.

According to this invention, the collision of a disk (a record medium) and an objective lens can be prevented by devising servo control during switching of the liquid crystal lens element and the focal position can be correctly shifted to a desired layer in an optical information reproducing apparatus for reproducing information from a multilayer optical disk.

According to this invention, the mechanical drive of a lens which has been used for a conventional type product is not required by using the liquid crystal lens element for an optical system, a small-sized optical head which is vibration-resistant can be realized, and the optical disk unit can be reduced in size. As a layer-to-layer shift is enabled with reference to the original S-curve signal position even if a liquid crystal lens element requiring long switching time is used and even if S-curve signals from plural layers or from false focal points, this invention has the advantage that the focal point can be correctly shifted to a desired layer. The optical head of the invention eliminates the need for the mechanical drive and the position control of a correcting lens such as a beam expander. The invention provides an optical head that can be easily reduced in size, is vibration-resistant, has long life, and can be manufactured at a low cost like the conventional type. Both the number of parts and the cost for adjustment can be reduced.

Thus, the invention provides a small-sized and reliable optical disk unit which is vibration-resistant for high-density multilayer optical disks, particularly those using blue/violet light, where spherical aberration is required to be corrected, at low cost.

DETAILED DESCRIPTION OF THE PREFERRED EMBODIMENTS

Figure 1:
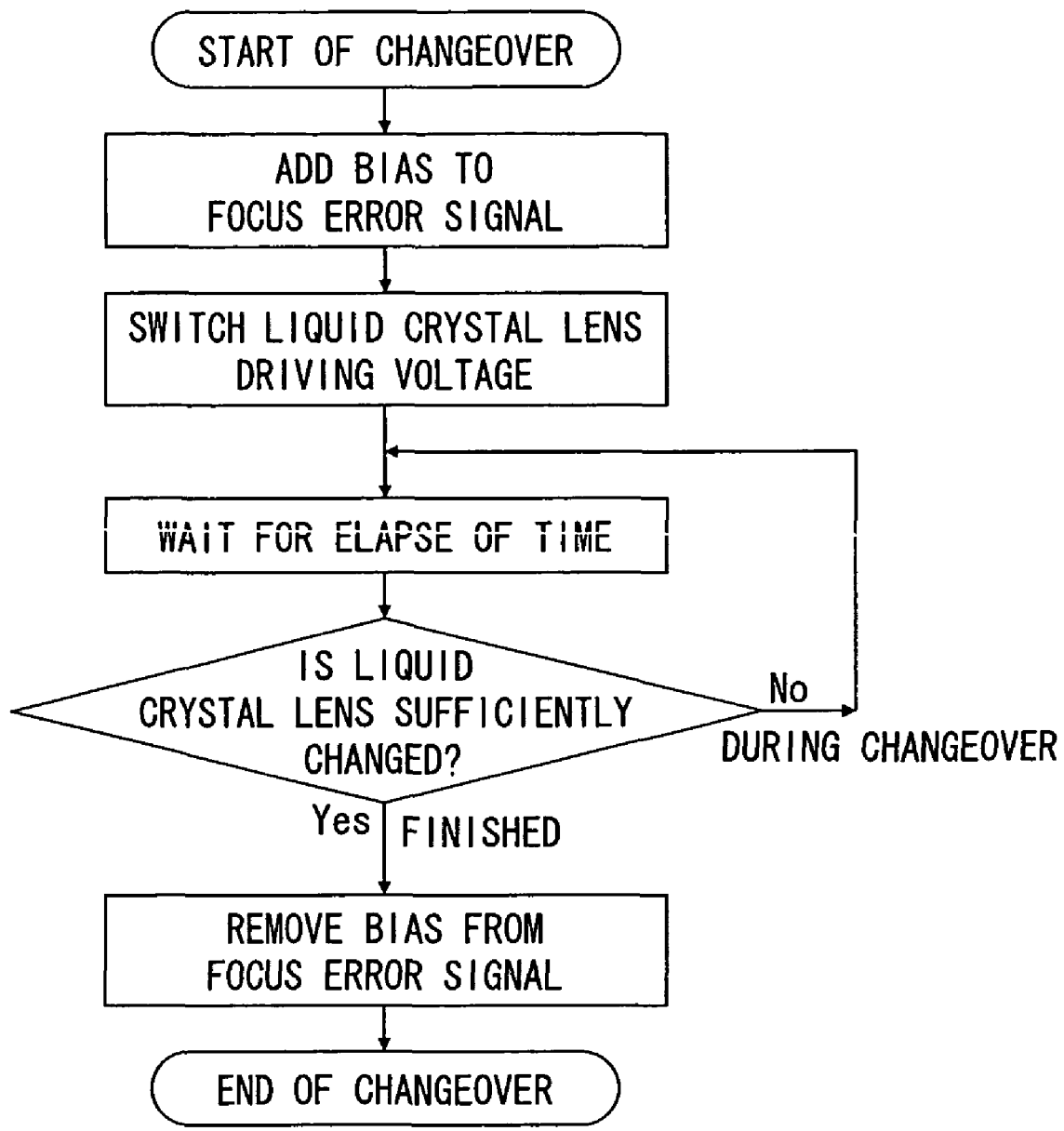
FIG. 1 shows an example of a focus control procedure according to the invention when layers are switched.

Referring to the drawings, embodiments of the invention will be described below. To facilitate understanding, the same reference numerals are allocated to parts having the same action throughout the drawings.

First Embodiment (Example of Configuration of Information Reproducing Apparatus Provided with Focus Bias Applying Means)

Figure 3:
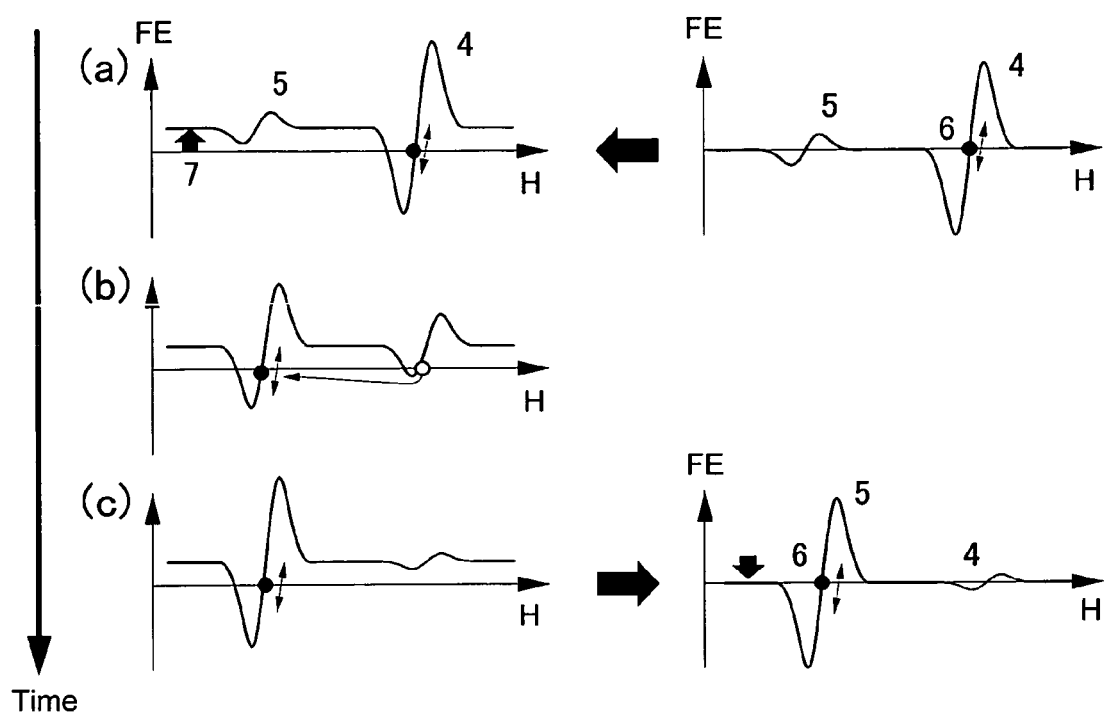
FIG. 3 shows examples of servo operation when focus bias is applied during switching from a first layer to a second layer.
Figure 4:
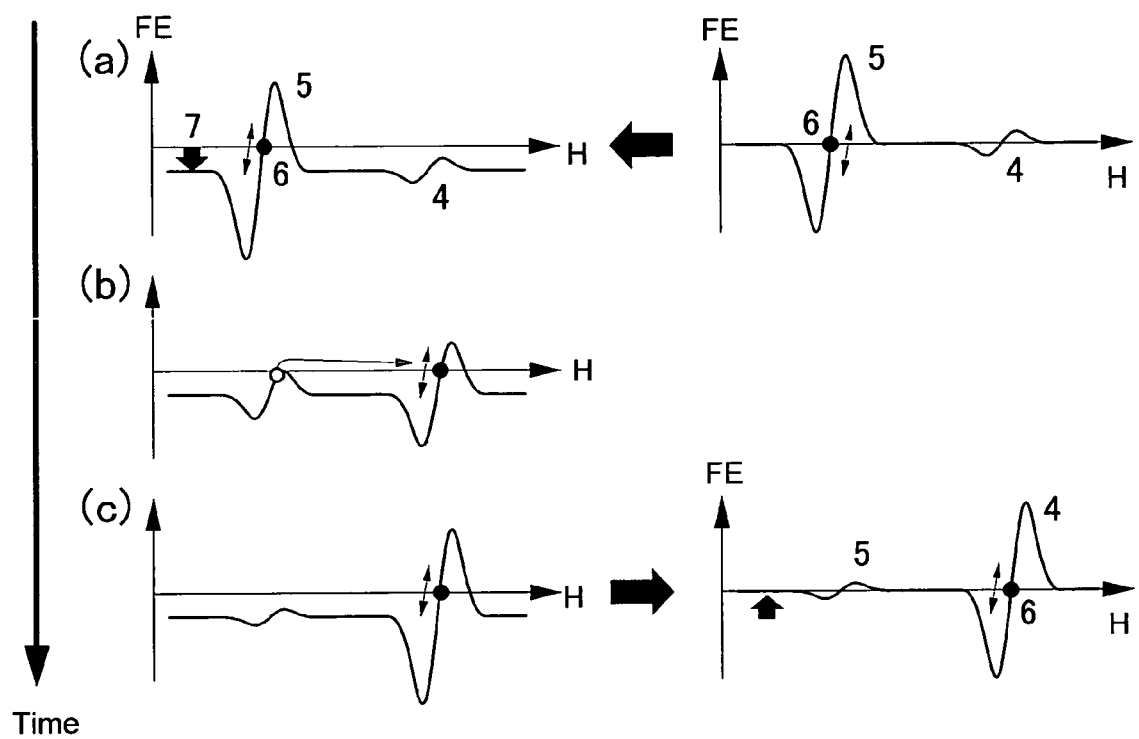
FIG. 4 show examples of servo operation when focus bias is applied during switching from the second layer to the first layer.
Figure 5:
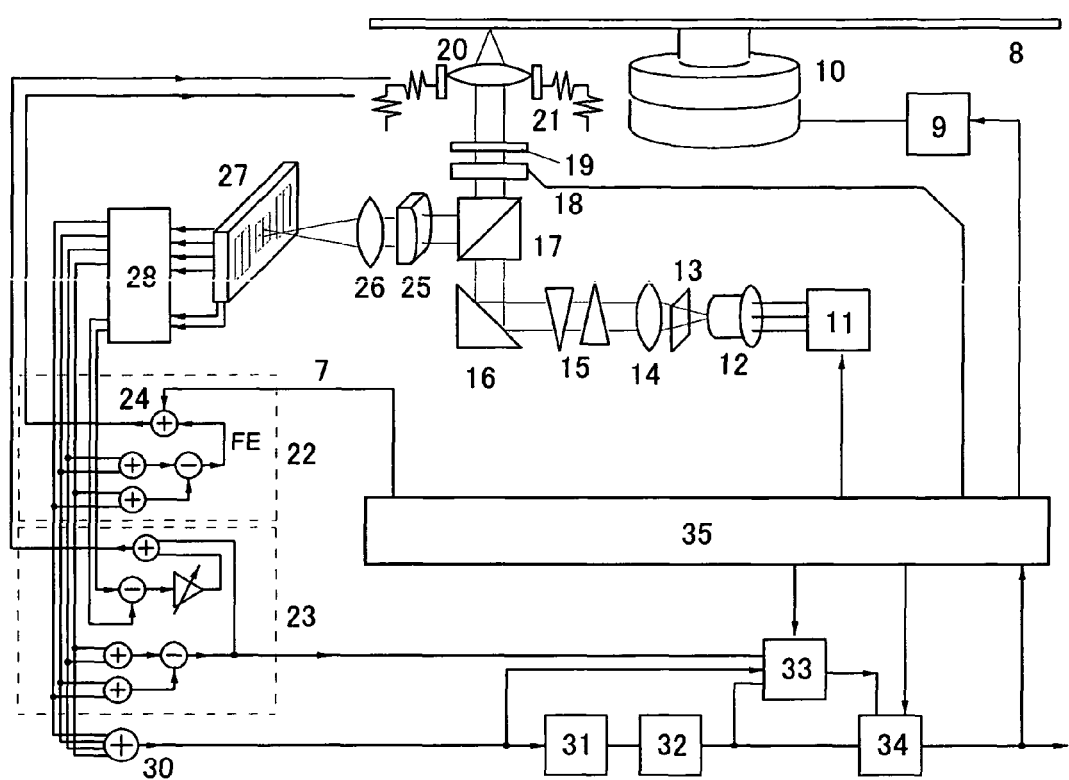
FIG. 5 shows an example of the configuration of an information reproducing apparatus according to the invention.

Referring to FIGS. 1 and 3 to 5, a first embodiment of an information reproducing apparatus according to the invention will be described below. FIG. 1 shows a flow of control, and FIGS. 3 and 4 show the behavior of a signal called an S-curve signal for servo-controlling the focal point and a control point. FIG. 5 is a schematic diagram showing an example of the configuration of the apparatus. In this embodiment, servo control during the switching of a liquid crystal lens element is stabilized by applying focus bias.

Referring to FIG. 5, the example of the whole configuration of the apparatus will be described below. An optical disk 8 that is an information recording medium is mounted on a motor 10 which rotational speed is controlled by a spindle motor controller 9. The medium is irradiated with a beam of light from a semiconductor laser 12 driven by a laser driver 11. The semiconductor laser 12 is a blue semiconductor laser, for example. The beam outgoing from the semiconductor laser 12 sequentially passes a diffraction grating 13 for the three-spot method, a collimating lens 14, and beam shaping prisms 15. The direction of the laser beam is changed by a reflecting mirror 16 and then the laser beam passes a polarizing beam splitter 17, a liquid crystal lens element 18 and a quarter-wave plate 19, and it is focused and shone on a recording film of the optical disk 8 by an objective lens 20.

The objective lens 20 is installed on an actuator 21 and is used for driving the focal position in the direction of height (a focusing direction) in accordance with a signal from a focus servo circuit 22 and in the direction of tracks in accordance with a signal from a tracking servo driver 23. At this time, the control point for the objective lens position can be shifted by a focus bias adder 24 by an amount corresponding to a focus bias 7 (see FIGS. 3 and 4). Spherical aberration associated with the switching of layers of a two-layer disk is corrected by the liquid crystal lens element 18. The liquid crystal lens element 18 switches its lens action in accordance with a control voltage of a main controller 35. Because the spherical aberration is corrected, the focused optical spot can be sufficiently narrowed. A minute mark pattern recorded on the optical disk 8 is read with the light. The focus bias 7 is added to a focal error signal FE as positive or negative bias depending on the direction of layer switching.

In the examples shown in FIGS. 3 to 4, positive focus bias 7 is applied when the liquid crystal lens element is switched from a first layer to a second layer, and negative focus bias 7 is applied when the liquid crystal lens element is switched from the second layer to the first layer. Thus, a control point 6 can be correctly drawn toward the S-curve waveform of the layer after the switching even after the disappearance of the S-curve waveform of the original layer due to the switching of the liquid crystal lens. A control procedure for switching shown in FIG. 1 shows the above-mentioned procedure. Specifically, bias is applied to the focal error signal FE when the liquid crystal lens element is switched, and after the switching of the liquid crystal lens element is sufficiently carried out and the servo control point is drawn toward the switched S-curve waveform, focus bias is removed.

A part of the radiated beam is reflected by the optical disk 8, passes the objective lens 20, the quarter-wave plate 19, and the liquid crystal lens element 18 again, and is then split in the direction of a cylindrical lens 25 this time by the polarizing beam splitter 17. The split beam passes the cylindrical lens 25 and a detection lens 26 and is detected by a four-quadrant photodetector on a photodetector chip 27 where it is converted into an electric signal. The electric signal is amplified by a photocurrent amplifier 28, and addition/subtraction is made based upon the signal, whereby a focal error signal is generated in the focus servo circuit 22, a tracking error signal is generated in the tracking servo driver 23, and a readout signal (an RF signal) is generated in an adder 30.

The focal error signal FE can be acquired by detecting the return light from the optical disk information recording medium with a four-quadrant photodetector according to the astigmatic method using the above-mentioned configuration, for example, and then detecting the difference in the sum of light amounts between the four-quadrant photodetector photodetecting surfaces along the diagonal. The tracking error signal can be acquired by detecting the difference between the signals of the sums of the amount of light on each of the four-quadrant photodetector photodetecting surfaces along the parting lines on each subspot photoreceiving surface in accordance with the three-spot method. The tracking error signal may be also generated by a differential push-pull method whereby this signal and a light-amount difference signal between each subspot are added or subtracted. Based on these signals, the position of the objective lens 20 is servo-controlled by driving actuator 21 and shifting its position in a direction such that the error signal is brought to zero.

In the meantime, the readout signal is converted into a recorded original digital signal by a decoder 34 via an equalizer 31, a level detector 32 and a synchronous clock generator 33. The synchronous clock generator 33 simultaneously and directly detects the readout signal, generates a synchronizing signal, and supplies it to the decoder 34. These circuits are collectively controlled by the main controller 35.

Figure 2:
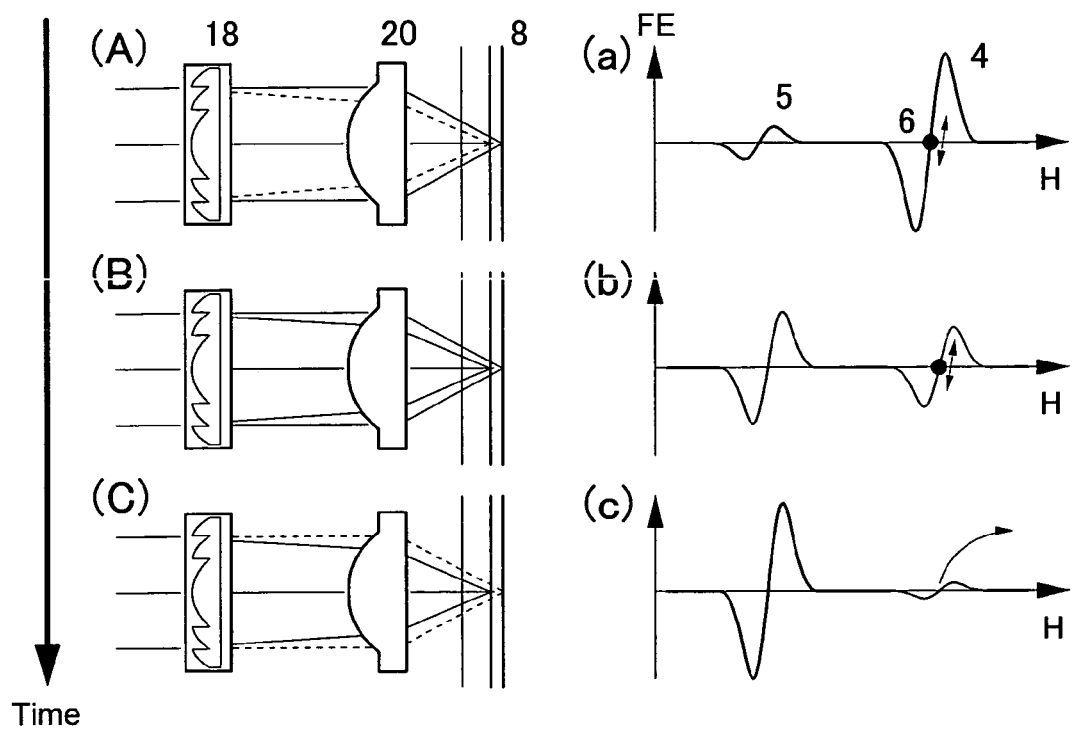
FIG. 2 shows examples of how the quantity of light changes during the switching of a liquid crystal lens element and how S-curve signals change.

Thus, the information reproducing apparatus according to this embodiment includes the light source for radiating a beam toward the information recording medium, the liquid crystal lens element inserted in the optical path from the light source to the information recording medium, the photodetector that detects a focal error amount by detecting the light amount difference in the return light from the information recording medium, the feedback controller for feeding back the focal error amount and controlling the focus position, and the means for applying bias to the target position of feedback control depending on the direction of switching during the switching of the liquid crystal lens element. By applying a focus bias in accordance with the switching direction and in synchronization with the switching of the liquid crystal lens element, the point at which servo becomes unstable due to the overlapping of S-curve signals during switching can be avoided, and, after the S-curve signal of the original layer vanishes, transfer to the target S-curve can be automatically achieved. As a result, the advantage can be obtained that the focal point can be automatically shifted to the target layer utilizing the appearance and disappearance of the S-curve signals. In addition, because the focus can be shifted while servo control is in effect, transfer can be made with respect to the position of the original layer and transfer to an adjacent layer can be reliably achieved. Further, there is the advantage that re-pulling-in of servo control is not required, the time for pulling-in can be reduced, and reliability is also enhanced. Furthermore, the advantage can be obtained that no detection of the overlapping of the S-curves is required so that a servo control system can be configured at a low cost. In this method, which, due to its operating principle, requires the application of a positive or negative focus bias depending on the switching direction of the liquid crystal lens element, the control point can be prevented from being destabilized as shown in FIG. 2(c), whereby stable focus control can be achieved during switching.

In accordance with the present embodiment, in an information reproducing apparatus, such as an optical disk unit using a liquid crystal lens element, the layer-to-layer shift of the focal point can be realized at a low cost using the simple method of applying focus bias. Because the focal point can be securely shifted to an adjacent layer without stopping focus servo control, high reliability can be achieved in environments in which vibration is frequently caused. While the present embodiment involved a two-layer disk, a recording medium with more layers can be used and the focal point can be shifted to the correct target layer even when S-curve signals of plural layers or S-curve signals from false focus points are overlapped, owing to the advantage that layer-to-layer shift can be made with respect to the original S-curve signal position layer.

In this configuration example, the discontinuous switching type of lens is used for the liquid crystal lens element. As the thickness of a liquid crystal layer between electrodes can be reduced by adopting Fresnel lens structure, for example, in the discontinuous switching type of liquid crystal lens element, a strong lens action can be produced with the small liquid crystal lens element. Thus, the pickup can be reduced in size. As an element with a thin liquid crystal layer can be utilized, response time can be reduced and the layers can be switched at higher speed. Therefore, the information reproducing apparatus has the advantage that the operation can be sped up.

Second Embodiment (Example of Configuration of Information Reproducing Apparatus Provided with Function for Holding Objective Lens)

Figure 6:
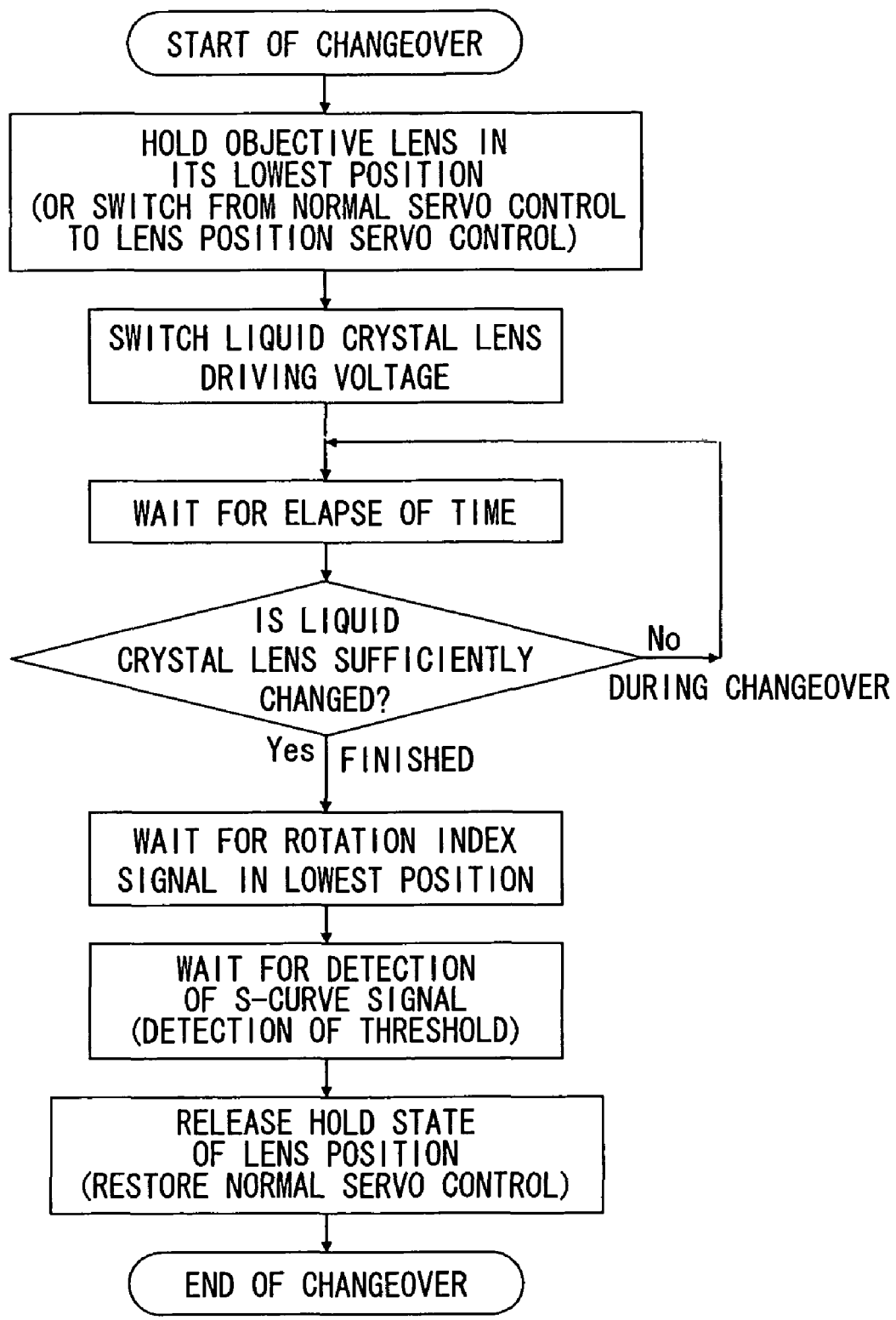
FIG. 6 shows an example of a focus control procedure according to the invention when the layers are switched.
Figure 7:
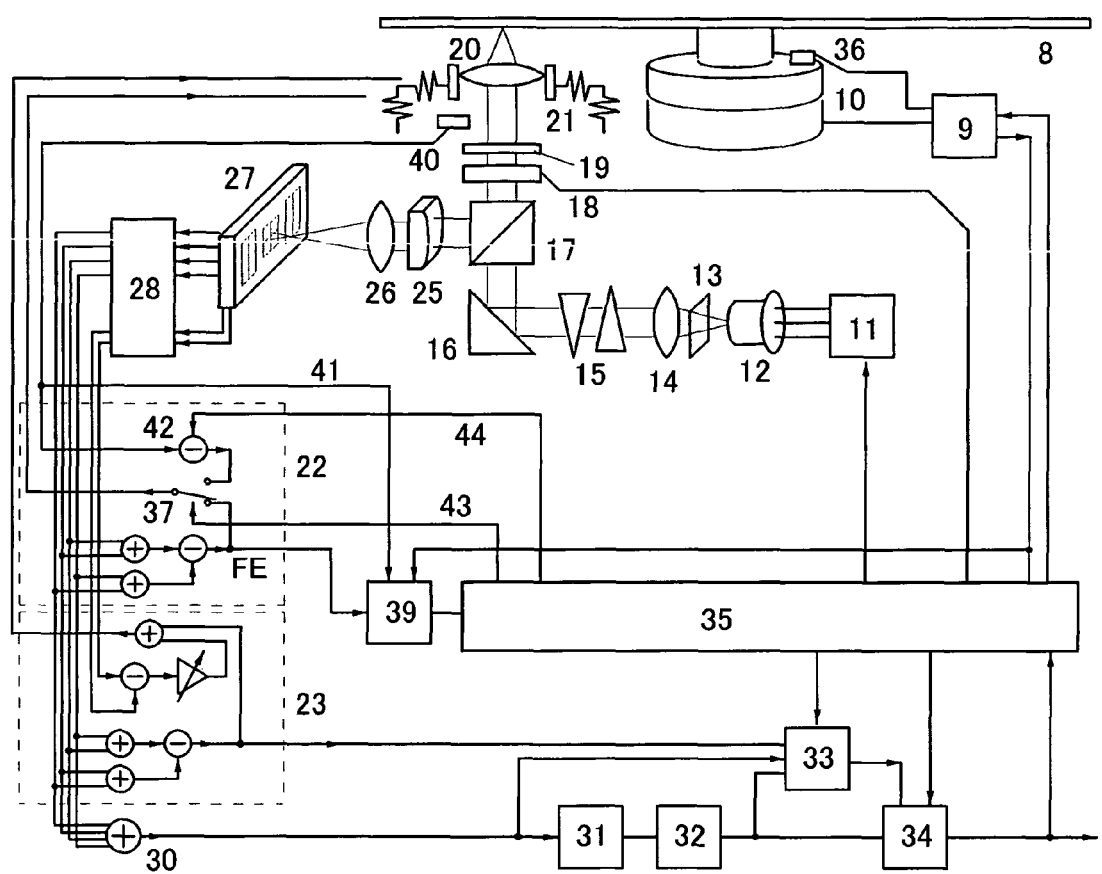
FIG. 7 shows an example of another configuration of the information reproducing apparatus according to the invention.
Figure 8:
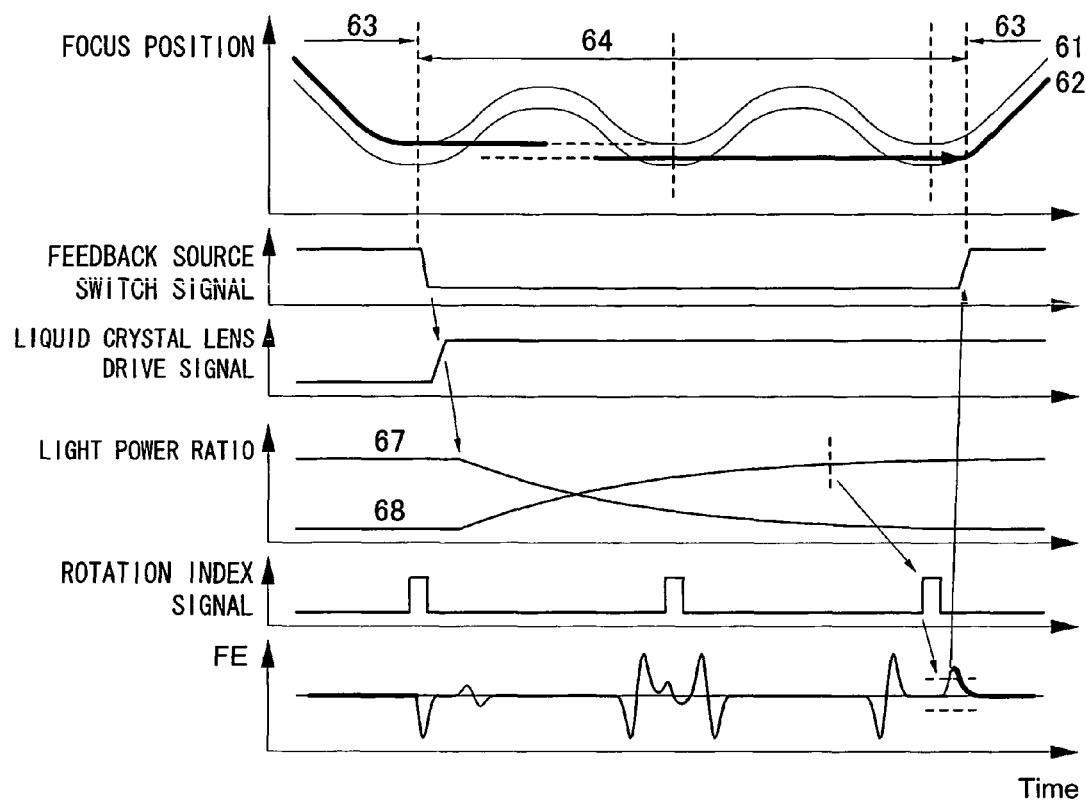
FIG. 8 shows an example of focus servo operation according to the invention when the layers are switched.

Referring to FIGS. 6 to 8, a second embodiment of the information reproducing apparatus according to the invention will be described below. FIG. 6 shows a flow of control, FIG. 7 shows the example of the configuration of the apparatus, and FIG. 8 shows the behavior of each control signal. In this embodiment, an objective lens position is sensed by a position sensor during the switching of a liquid crystal lens element and servo control is held.

Referring to FIG. 7, the whole configuration of the apparatus will be described. An optical disk 8 which is an information recording medium is installed on a motor 10 which rotational speed is controlled by a spindle motor controller 9. A rotation sensor 36 is provided to the motor and a rotation index signal is generated. A beam of light is radiated toward the medium from a semiconductor laser 12 driven by a laser driver 11. The semiconductor layer 12 is a blue beam semiconductor laser, for example. The beam from the semiconductor laser 12 sequentially passes a diffraction grating 13 for the three-spot method, a collimating lens 14, and beam shaping prisms 15. The direction of the laser beam is changed by a reflecting mirror 16 and then the laser beam with changed direction passes a polarizing beam splitter 17, a liquid crystal lens element 18, and a quarter-wave plate 19, and it is then focused on a recording film of the optical disk 8 by an objective lens 20.

The objective lens 20 is installed on an actuator 21 whereby the focus position can be driven in the direction of height (a focusing direction) in accordance with a signal from a focus servo circuit 22 and in the direction of the tracks in accordance with a signal from a tracking servo driver 23. An objective lens position sensor 40 is installed in the vicinity of the objective lens 20. It senses the position in the direction of the height (the focusing direction) of the objective lens, and can acquire an objective lens position signal 41. For the objective lens position sensor, a reflecting mirror type photocoupler is used. Spherical aberration is corrected in accordance with the switching of layers in the two-layer disk by the liquid crystal lens element 18. The liquid crystal lens element switches its lens action in accordance with a control voltage from a main controller 35. A focused optical spot can be sufficiently converged by correcting the spherical aberration. A minute mark pattern recorded on the optical disk 8 is read with this beam.

A part of the radiated beam is reflected on the optical disk 8, passes the objective lens 20, the quarter-wave plate 19, and the liquid crystal lens element 18 again, and is then split in the direction of a cylindrical lens 25 this time by the polarizing beam splitter 17. The split beam passes the cylindrical lens 25 and a detection lens 26, detected by a four-quadrant photodetector on a photodetector chip 27, and then converted to an electric signal. The electric signal is amplified by a photocurrent amplifier 28, and then addition/subtraction is made based upon the signal, whereby a focal error signal is generated by the focus servo circuit 22, a tracking error signal is generated by the tracking servo driver 23, and a readout signal (an RF signal) is generated by an adder 30. The method of generating the focal error signal and the tracking error signal is similar to that in the first embodiment.

In addition, an objective lens position feedback controller 42 is provided that controls the feedback of an objective lens position signal 41 and that can control the objective lens height in accordance with an objective lens position control voltage 44. Further, a feedback source switcher 37 is provided which switches feedback control between the one depending upon the focal error signal and the one depending upon the objective lens position signal in accordance with a feedback source switching signal.

FIG. 6 shows the switching and a procedure for the switching of the liquid crystal lens element as a switching control procedure. Specifically, the rotation of the disk is sensed by a rotation index signal, feedback control is switched to the feedback of the lens position at the point where the objective lens height is the lowest, and the objective lens is then held in the lowest position, that is, in a position which is the farthest from the optical disk 8. Next, after a switching of the liquid crystal lens element is started, the sufficient switching of the liquid crystal lens element is awaited and then a shift to a disk rotation position corresponding to the lowest position is sensed again via the rotation index signal. The detection of a threshold of a focal error signal FE is then awaited. When an S-curve signal of fixed or more intensity is detected and it becomes possible to pull the control point into the S-curve signal of the shifted layer, feedback control is returned to the feedback of a focal error signal, and the holding of the lens position is released. The procedure shown in FIG. 6 is as described above. There is provided an S-curve signal detector 39 for detecting a focal error signal FE in synchronization with a rotation index signal.

FIG. 8 shows concrete signals and servo operation. First layer height 61 and second layer height 62 vary due to the deflection of the rotation of the disk. In a normal servo state 63 in which focus servo functions, the focus position follows the deflection of the rotation. To avoid the collision of the objective lens with the disk, in the lowest position in which the objective lens height is the lowest, servo control is switched to feedback control depending upon the lens position signal (by a feedback source switch signal), the lens position is held, and a shift to a hold state 64 is made. Simultaneously, the rotation position is stored by a rotation index signal and the liquid crystal lens element drive signal is switched. As the light amount ratio of the intensity of light reflected from the first layer 67 and the intensity of light reflected from the second layer 68 starts to vary and when the intensity of light reflected from the second layer 68 sufficiently increases, the liquid crystal lens element is switched, the rotation index signal is sensed and the detection of the threshold of the focal error signal FE is awaited. When an S-curve signal of fixed or more intensity is detected and the control point is shifted into the S-curve signal of the shifted layer, the feedback source switch signal is returned, feedback control is returned to the feedback of the focal error signal again, the holding of the lens position is released, and the normal servo state is restored. Thus, the control point is shifted into the S-curve signal and the focus position follows the shifted second layer height 62. These are the operations shown in FIG. 8.

To continue the explanation referring to FIG. 7 again, the readout signal is converted to a recorded original digital signal in a decoder 34 via an equalizer 31, a level detector 32 and a synchronous clock generator 33. The synchronous clock generator 33 simultaneously and directly senses the readout signal, generates a synchronous signal, and supplies it to the decoder 34. These circuits are generically controlled by the main controller 35, as in the first embodiment.

Specifically, the information reproducing apparatus according to this embodiment includes a light source for radiating a beam toward the information recording medium, the liquid crystal lens element inserted in the optical path from the light source to the information recording medium, the objective lens inserted in the optical path, the lens position sensor for sensing the focus-direction position of the objective lens, the photodetector for detecting the focal error amount by detecting the light amount difference in the return light from the information recording medium, a feedback controller for feeding back the focal error amount and controlling the position of the objective lens, a feedback controller for feeding back a lens position signal sensed by the lens position sensor and controlling the position of the objective lens, and switching means for switching to feedback control depending upon the lens position signal during the switching of the liquid crystal lens element. During switching, the lens position can be held in the vicinity of the layer, avoiding the collision of the record medium and the objective lens by fixing (holding) the lens position during the time when servo control is made unstable by the overlap of S-curve signals. In this way, focus servo control in the switching can be stabilized. Compared with the method in which the lens position is not detected, the holding precision of the lens position during switching is higher. Thus, the information reproducing apparatus according to this embodiment has the advantage that the displacement of the lens for the withdrawal of the lens during switching can be reduced, and the layer switching process can be sped up. Besides, the information reproducing apparatus according to this embodiment has the advantage that as the lens position can be precisely held by servo control, an S-curve signal during the switching of the liquid crystal lens element can be detected, and it can be securely determined whether the switching is finished or not.

In this configuration, the information recording medium is a rotary record medium and the switching means switches feedback control depending upon the focal error amount and the feedback control depending upon the lens position signal in synchronization with the rotation of the information recording medium. A starting point of the switching of the liquid crystal lens element is located in a safe position apart from the medium by switching the feedback control in synchronization with the rotation, and the objective lens can be held in a safe position in which the objective lens can be prevented from colliding with the medium. This effect is particularly apparent in an information reproducing apparatus which uses a light source that radiates a blue beam and in which the working distance of the objective lens is small. The information reproducing apparatus has the advantage that the collision of the objective lens and the record medium is prevented and the reliability and the life of the apparatus and recorded information can be enhanced.

In this configuration, the information recording medium is a rotary record medium, and the switching means detects an S-curve waveform of a focus offset amount signal in synchronization with the rotation of the information recording medium and determines whether a switching of the liquid crystal lens element is finished or not. The information reproducing apparatus to this embodiment includes the light source for radiating a beam toward the rotary information recording medium, the liquid crystal lens element inserted in the optical path from the light source to the information recording medium, the objective lens inserted in the optical path, the photodetector for detecting a focal error amount by detecting the light amount difference in the return light from the information recording medium, a feedback controller for feeding back the focal error amount and controlling the focus position, and means for detecting an S-curve signal showing the focal error amount in synchronization with the rotation of the information recording medium. The feedback controller includes switching means for holding the position of the objective lens during switching of the liquid crystal lens element. The switching means detects an S-curve signal while the position of the objective lens is held, and determines whether the switching of the liquid crystal lens element is finished or not. The information reproducing apparatus to this embodiment has the advantage that the switching process can be finished more quickly by detecting the finish of the switching of the liquid crystal lens element by the S-curve signal while the objective lens is held than in the case where the finish is not detected and a sufficient waiting time is taken. Thus, the access speed of the apparatus can be sped up.

Particularly, as the variation of switching time of the liquid crystal lens element with (the change of) ambient temperature is large, the finish of switching can be correctly determined by the detection of an S-curve signal regardless of the variations in the temperature distribution in a pickup, for example. Thus, the layer switching process can be sped up as compared with the case where the finish of switching is simply awaited for a fixed time. Besides, even if the rotational nonuniformity of the medium includes indefinite fluctuation, detection can be made a plurality of times based on rotation synchronization for accuracy, a mean locus of the rotational nonuniformity of the medium and the amount of the indefinite fluctuation can be estimated, and a safe switching timing can be determined. Thus, the information reproducing apparatus to this embodiment has the advantage that when the layers are switched, the shift of the focus position can be securely made and the reliability of access can be enhanced.

In this configuration, the information recording medium is a rotary record medium, and the switching means detects a threshold of the focus error signal and releases the feedback of the lens position signal when a signal of a fixed threshold or a larger value is detected. According to this procedure, the control point can be securely shifted into the S-curve signal of the destination layer, and after the switching of the liquid crystal lens element is finished, original servo control can be correctly restored. Thus, the information reproducing apparatus according to this embodiment has the advantage that the stability of servo control after the switching of the layers is enhanced and the reliability of access is enhanced.

As described above, in the information reproducing apparatus according to this embodiment, the liquid crystal lens element and the objective lens position sensor are used, switching to lens position servo control is effected and held, position servo control is released when an S-curve signal equal to or exceeding the threshold is detected in the switched layer after the switching of the liquid crystal lens element, and then normal servo control is restored. In this way, secure layer-to-layer shift can be carried out and the switching process can be performed at higher speed.

In this configuration, the discontinuous switching type of lens can be also used for a liquid crystal lens element. An advantage by using the discontinuous switching type of liquid crystal lens element is similar to that in the first embodiment. Because response time can be reduced and the switching of the layers can be performed at higher speed, the operation of the apparatus can be sped up.

Third Embodiment (Example of Configuration of Information Reproducing Apparatus Provided with Function for Vibrating Objective Lens)

Figure 9:
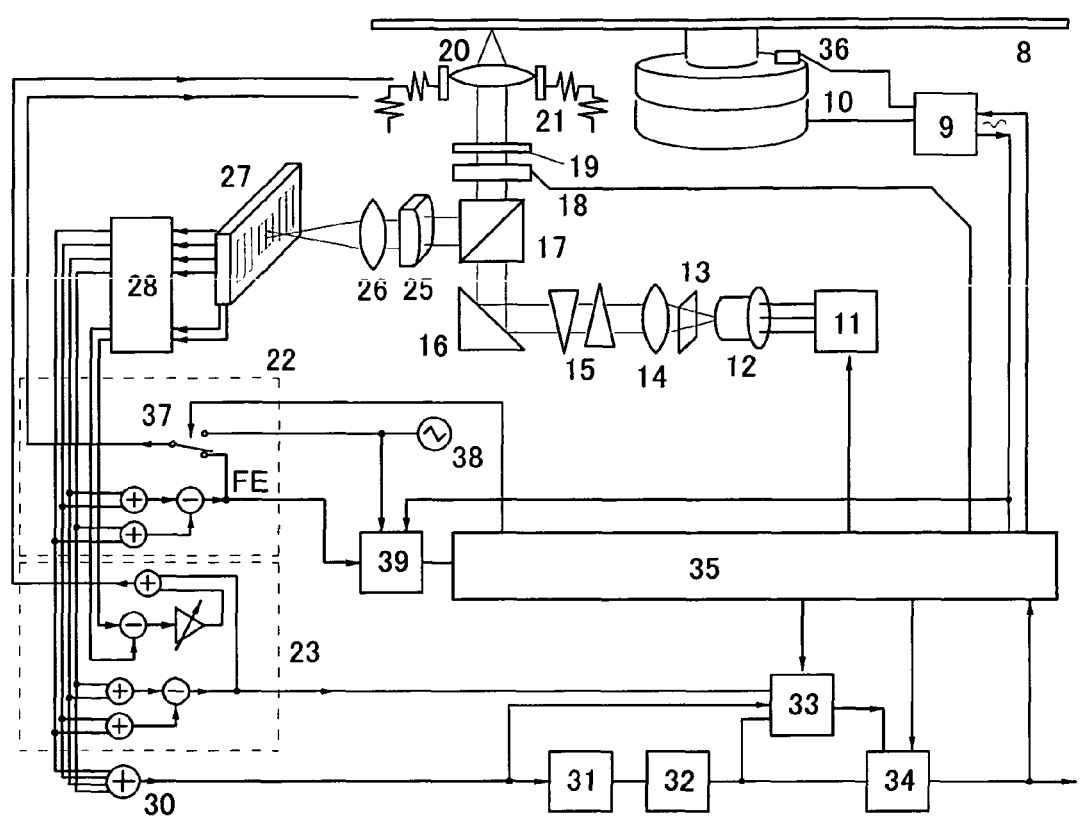
FIG. 9 shows an example of another configuration of the information reproducing apparatus according to the invention.
Figure 10:
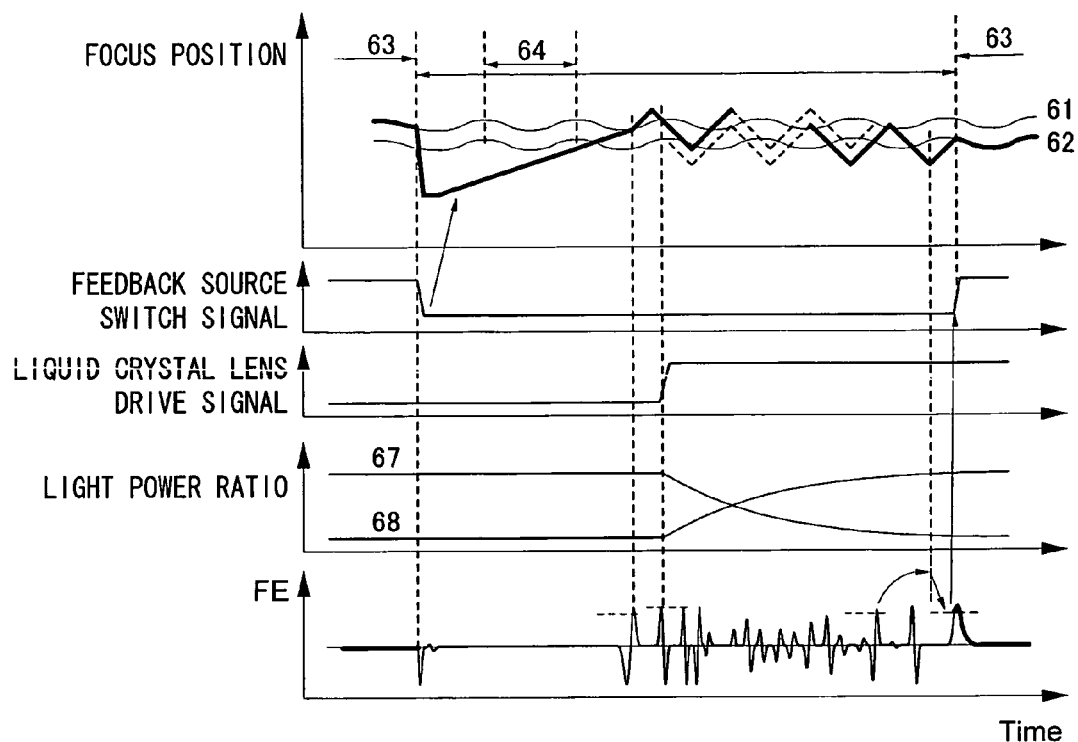
FIG. 10 is an explanatory drawing for explaining a procedure for driving an objective lens according to the invention.

Referring to FIGS. 9 and 10, a third embodiment of the information reproducing apparatus according to the invention will be described below. An information reproducing apparatus according to this embodiment includes vibration means for intentionally vibrating the objective lens position vertically during the switching of the liquid crystal lens element in case sufficient deflection with the rotation of the disk cannot be detected as in the second embodiment.

Referring to FIG. 9, the apparatus will be described below. An optical disk 8 which is an information recording medium is installed on a motor 10 which rotational speed is controlled by a spindle motor controller 9. A rotation sensor 36 is provided to the motor and the rotation sensor generates a rotation index signal. A beam of light from a semiconductor laser 12 driven by a laser driver 11 is radiated toward the medium. The semiconductor laser 12 is a blue semiconductor laser, for example. The beam from the semiconductor laser 12 sequentially passes a diffraction grating 13 for the three-spot method, a collimating lens 14, and beam shaping prisms 15. The direction of the laser beam is changed by a reflecting mirror 16, and then the laser beam the direction of which is changed passes a polarizing beam splitter 17, the liquid crystal lens element 18, and a quarter-wave plate 19, and then it is focused on a recording film of the optical disk 8 by an objective lens 20. A minute mark pattern recorded on the optical disk 8 is read with the beam.

The objective lens 20 is installed on an actuator 21 whereby the focus position can be driven in the direction of height (in a focusing direction) in accordance with a signal from a focus servo circuit 22 and in the direction of the tracks in accordance with a signal from a tracking servo driver 23. Spherical aberration is corrected in accordance with the switching of layers of the two-layer disk by the liquid crystal lens element 18. The liquid crystal lens element switches its lens action in accordance with a control voltage from the main controller 35.

A part of the radiated beam is reflected on the optical disk 8, passes the objective lens 20, the quarter-wave plate 19 and the liquid crystal lens element 18 again, and is split in the direction of a cylindrical lens 25 this time by the polarizing beam splitter 17. The split beam passes the cylindrical lens 25 and a detection lens 26, is detected by a four-quadrant photodetector on a photodetector chip 27, and is then converted into an electric signal. This electric signal is amplified by a photocurrent amplifier 28, and then addition/subtraction is made based upon this signal, whereby a focal error signal is generated by the focus servo circuit 22, a tracking error signal is generated by the tracking servo driver 23, and a readout signal (an RF signal) is generated by an adder 30. The method of generating the focal error signal and the tracking error signal is similar to that in the first embodiment.

In addition, a feedback source switcher 37 is provided so that feedback control depending upon the focal error signal and feedback control depending upon a signal for directly driving the objective lens position can be switched. The procedure for this switching and the switching of the liquid crystal lens element is similar to the switching control procedure shown in FIG. 6. However, because the rotational position at which the objective lens height is the lowest cannot be securely known as in the second embodiment, the objective lens is withdrawn to a position where it does not collide with the disk immediately after the switching. Then, the switching of the liquid crystal lens element is started and a sufficient switching of the liquid crystal lens element is awaited. The objective lens height is then gradually controlled while the disc is rotating, simultaneously searching, with an objective lens vertical vibrator 38, for a position at which the disk can be prevented from colliding due to rotational deflection. When the objective lens height can be controlled to a position at which an S-curve signal of the shifted layer is acquired by an S-curve signal detector 39 via a focal error signal FE, the detection of a threshold of the S-curve signal is awaited, and, when an S-curve signal of fixed or more intensity is detected, feedback control is returned to the feedback of a focal error signal again, and then a normal servo state is restored. Thus, the control point can be shifted into the S-curve signal and the focus position can be caused to follow the shifted layer.

FIG. 10 shows concrete signals and servo operation. First layer height 61 and second layer height 62 gently vary due to the deflection of the rotation of the disk. In the normal servo state 63 in which focus servo control is carried out, the focus position follows the deflection of the rotation. To avoid the collision of the objective lens with the disk, the objective lens is withdrawn to a height at which the deflection of the rotation can be sufficiently avoided. Thereafter, the objective lens is gradually brought close to the optical disk until it approaches a position at which an S-curve signal is observed by a focal error signal FE again. When an S-curve signal equal to or exceeding a threshold is observed, the vibration of the objective lens 20 is started by the objective lens vibrator 38 and a liquid crystal lens element drive signal is switched. The light amount ratio of the intensity of light reflected from the first layer 67 and the intensity of light reflected from the second layer 68 starts to vary. In this period of time, first-and second-layer S-curve signals in accordance with the light amount ratio coexist in a focal error signal FE. However, the amplitude of each S-curve signal during switching decreases as compared with that before the switching. When the state of the liquid crystal lens element is sufficiently changed, the first-layer S-curve signal substantially vanishes and the second-layer S-curve signal increases. When the intensity of light reflected from the second layer 68 increases and the state of the liquid crystal lens element is changed, the inversion of the vertical movement by the objective lens vibrator 38 is sensed, and then the detection of a threshold of the focal error signal FE is awaited. When an S-curve signal of fixed or more intensity is detected and the control point is shifted into the S-curve signal of the destination layer, a feedback source switch signal is returned so as to return the feedback control back to the feedback of a focal error signal again, and then the normal servo state is restored. Thus, the control point can be shifted into the S-curve signal and the focus position can be caused to follow the shifted second layer height 62. These are the operations shown in FIG. 10. The operation of other signal processing is similar to that in the second embodiment.

Thus, the information reproducing apparatus to this embodiment includes the vibrator for vibrating the objective lens during the switching of the liquid crystal lens element whereby, in case the rotational nonuniformity of the disk is small and no S-curve signal is detected, an S-curve signal can be detected by intentionally vibrating the objective lens actuator. Even if an S-curve signal is hardly detected because the rotation of the medium is not deflected, an S-curve signal can be detected during or at the end of the switching of the liquid crystal lens element by intentionally vibrating the objective lens. Thus, the information reproducing apparatus to this embodiment has the advantage that, when information is reproduced from the medium having hardly any warp or deflection with rotation, the finish of the switching of the liquid crystal lens element can be sensed and the layer switching process can be correctly executed, whereby the operational reliability of the apparatus is enhanced.

Fourth Embodiment (Example of Configuration of Information Reproducing Apparatus for Card-type Multilayer Record Medium)

Figure 11:
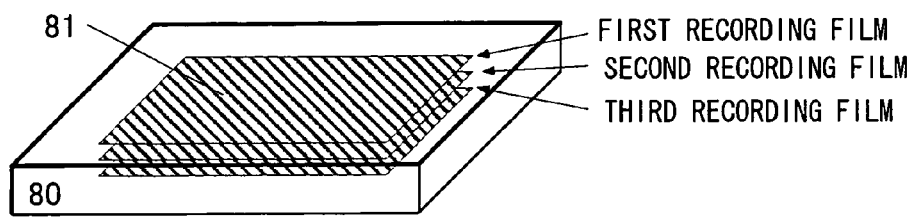
FIG. 11 shows an example of the structure of a card-type multilayer record medium.
Figure 12:
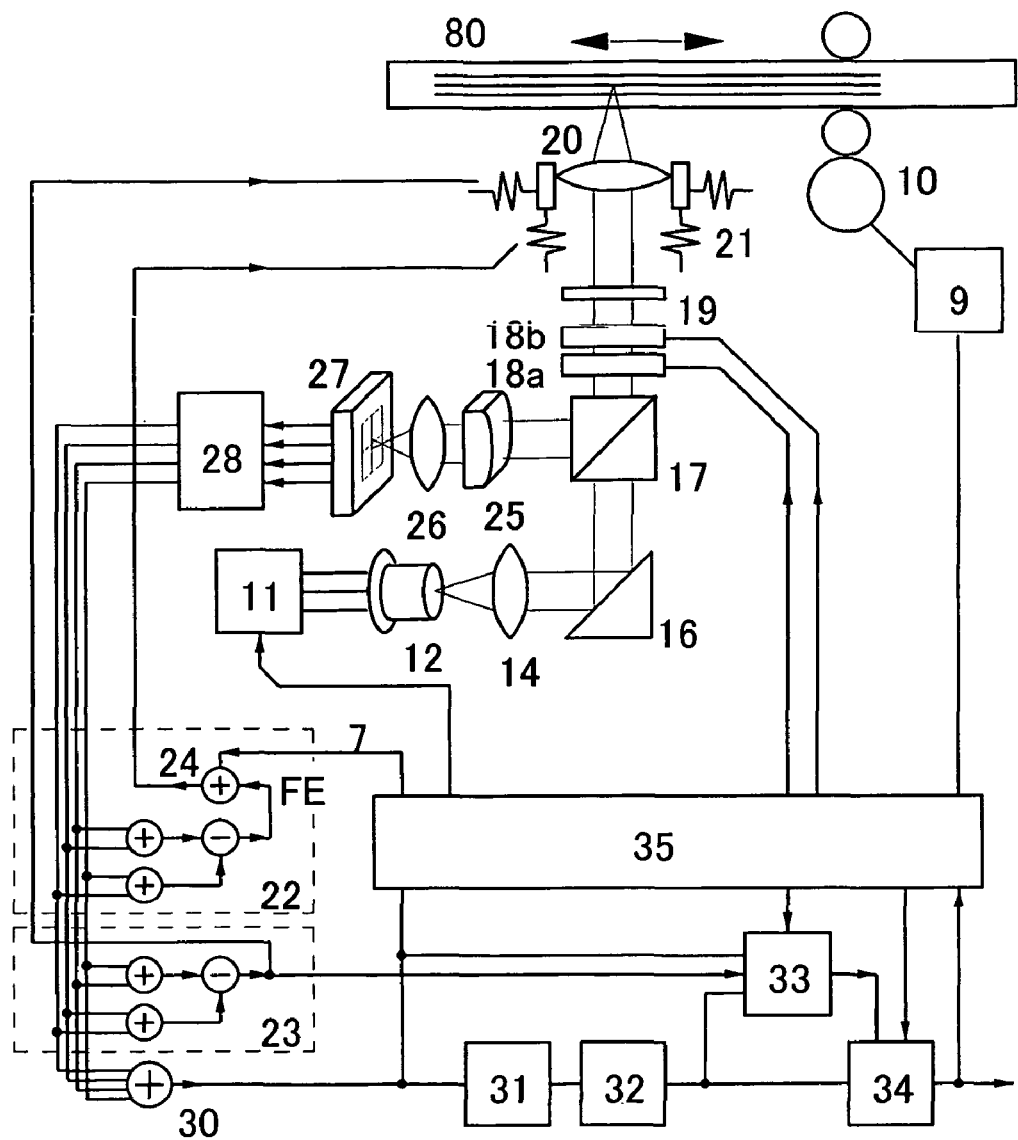
FIG. 12 shows an example of the configuration of an information reproducing apparatus for the card-type record medium according to the invention.

Referring to FIGS. 11 and 12, a fourth embodiment of the information reproducing apparatus according to the invention will be described below. This embodiment shows an example of the configuration of the apparatus where a card-type multilayer record medium is used as a record medium. For the multilayer record medium, a card-type multilayer record medium 80 shown in FIG. 11 is used. In this example, three recording films 81 are provided in the medium.

Referring to FIG. 12, the example of the whole configuration of the apparatus will be described below. The card-type information recording medium 80 can be horizontally slid by a motor 10 which rotational speed is controlled by a spindle motor controller 9. A beam of light from a semiconductor laser 12 driven by a laser driver 11 is radiated toward the medium. The beam from the semiconductor layer 12 passes a collimating lens 14, its direction is changed by a reflecting mirror 16, and the beam the direction of which has been changed then passes a polarizing beam splitter 17, liquid crystal lens elements 18a and 18b, and a quarter-wave plate 19, and it is then focused on any of the recording films 81 of the card-type information recording medium 80 by an objective lens 20. A minute mark pattern recorded on the recording film 81 is read with this beam.

The objective lens 20 is installed on an actuator 21, whereby the focus position can be driven in the direction of height (a focusing direction) in accordance with a signal from a focus servo circuit 22 and in the direction of a track in accordance with a signal from a tracking servo driver 23. Spherical aberration associated with the three recording films 81 is corrected by the liquid crystal lens elements 18a and 18b. The liquid crystal lens element 18a is a lens for switching the first recording film and the second recording film and the liquid crystal lens element 18b is a lens for switching the second recording film and the third recording film. Thus, spherical aberration associated with the three recording films is corrected. The liquid crystal lens elements 18a and 18b switch their lens action in accordance with a control voltage from a main controller 35.

A part of the radiated beam is reflected on the card-type information recording medium 80 and passes the objective lens 20, the quarter-wave plate 19 and the liquid crystal lens elements 18b and 18a again. It is then split in the direction of a cylindrical lens 25 this time by the polarizing beam splitter 17. The split beam passes the cylindrical lens 25 and a detection lens 26, detected by four-quadrant photodetector on a photodetector chip 27, and then converted into an electric signal. The electric signal is amplified by a photocurrent amplifier 28, and then addition/subtraction is made based upon the signal, whereby a focal error signal is generated by a focus servo circuit 22, a tracking error signal is generated by a tracking servo driver 23, and a readout signal (an RF signal) is generated by an adder 30. The method of generating the focal error signal and the tracking error signal and the procedure for the switching of the liquid crystal lens elements are similar to those in the first embodiment. The movement corresponding to the rotation of the disk in the first embodiment is replaced with the sideway movement of the medium by the motor. Focus bias 7 is added to the focal error signal 3 in accordance with the switching direction of the recording films, as a positive or negative bias by a focus bias adder 24. When the state of the liquid crystal lens element 18a is changed from the first recording film to the second recording film, positive focus bias 7 is added, while when the state of the liquid crystal lens element 18a is changed from the second recording film to the first recording film is returned, negative focus bias 7 is added. Similarly, when the state of the liquid crystal lens element 18b is changed from the second recording film to the third recording film, positive focus bias 7 is added while when the state of the liquid crystal lens element 18b is returned from the third recording film to the second recording film, negative focus bias 7 is added. Thus, the control point can be correctly shifted into an S-curve signal of the switched recording film by the switching of the liquid crystal lens element after an S-curve signal of the original film vanishes.

Thus, the information reproducing apparatus to this embodiment includes a light source for radiating a beam toward the card-type information recording medium provided with the plural recording films, the liquid crystal lens elements inserted in the optical path from the light source to the card-type information recording medium, a photodetector that detects the focal error amount by detecting the light amount difference in the return light from the card-type information recording medium, a feedback controller for feeding back the focal error amount and controlling the focus position, and means for applying a bias in accordance with the switching direction to a target position of feedback control during the switching of the liquid crystal lens element. An automatic shift into an S-curve signal of the shifted recording film is enabled by adding focus bias in accordance with the switching direction in synchronization with the switching of the liquid crystal lens element after an S-curve signal of the original recording film vanishes. As a result, the focus point can be automatically shifted onto the destination recording film utilizing the appearance and disappearance of the S-curve signals. The information reproducing apparatus to this embodiment has the advantage that, because the focus can be shifted while servo control is being applied, the re-pulling-in of servo control is not required and the time required for pulling-in can be reduced.

The procedure for the switching of the liquid crystal lens element and the layers according to the invention may consist of an arbitrary combination of the first embodiment, the second embodiment, and the third embodiment. For example, the switching process may be also executed using the safer or faster one of the first and second embodiments depending on the amount of rotational deflection of the disk, for example. In this case, the configurations of the apparatus in the first embodiment and the second embodiment may be also combined. Besides, the configurations of the second embodiment and the third embodiment may be also arbitrarily combined with the configuration of the fourth embodiment. The advantages of each configuration described in each embodiment can be also acquired in the configuration of the combined embodiments.

What is claimed is:

1. An information reproducing apparatus, comprising:
   a medium drive unit for fixing and driving an optical recording medium having multiple recording layers;
   a light source;
   an objective lens for focusing light from the light source on the optical recording medium;
   an objective lens drive unit for driving the objective lens in a focusing direction;
   a liquid crystal lens element having a discontinuous switching type of lens arranged in an optical path from the light source to the optical recording medium for correcting spherical aberration associated with an interlayer switching between one recording layer to another recording layer on the optical recording medium;
   a photo-detector for detecting a focal error amount based on differences in the amount of light returning from the optical recording medium;
   feedback control means for feeding back the focal error amount to the objective lens drive unit for controlling a focus position; and
   means for applying a focus bias to a target position of the feedback control in accordance with a direction of the interlayer switching and in synchronization with the interlayer switching of the liquid crystal lens element.

2. The information reproducing apparatus as claimed in claim 1, wherein the focus bias is applied to the focal error amount as a positive or negative focus bias in accordance with the direction of the interlayer switching.

3. The information reproducing apparatus as claimed in claim 2, wherein the positive focus bias is applied when the liquid crystal lens element is switched from a first recording layer to a second recording layer on the optical recording medium, and wherein the negative focus bias is applied when the liquid crystal lens element is switched from the second recording layer to the first recording layer on the optical recording medium.

4. The information reproducing apparatus as claimed in claim 2, wherein the focus bias is applied to the focal error amount when the liquid crystal lens element is switched between recording layers on the optical recording medium, and after the interlayer switching of the liquid crystal lens element is carried out, the focus bias is removed to ensure that a focal point is shifted to a target layer on the optical recording medium.

5. An information reproducing apparatus comprising:
   a light source to generate light;
   an objective lens arranged to focus light from the light source onto an optical recording medium having multiple recording layers;
   a discontinuous switching type of liquid crystal lens element arranged in an optical path from the light source to the optical recording medium to correct spherical aberrations associated with an interlayer switching between recording layers in the optical recording medium;
   a photo-detector arranged to detect a focal error amount based on differences in an amount of light returning from the optical recording medium;
   a servo control circuit arranged to perform servo control based on the focal error amount; and
   means for applying a bias in accordance with a direction of the interlayer switching and in synchronization with the interlayer switching of the liquid crystal lens element so that a focal point of the objective lens is automatically shifted to a target layer in the optical recording medium.

6. The information reproducing apparatus as claimed in claim 5, wherein the focus bias is applied to the focal error amount as a positive or negative focus bias in accordance with the direction of the interlayer switching.

7. The information reproducing apparatus as claimed in claim 6, wherein the positive focus bias is applied when the liquid crystal lens element is switched from a first recording layer to a second recording layer on the optical recording medium, and wherein the negative focus bias is applied when the liquid crystal lens element is switched from the second recording layer to the first recording layer on the optical recording medium.

8. The information reproducing apparatus as claimed in claim 6, wherein the focus bias is applied to the focal error amount when the liquid crystal lens element is switched between recording layers on the optical recording medium, and after the interlayer switching of the liquid crystal lens element is carried out, the focus bias is removed to ensure that the focal point is shifted to the target layer on the optical recording medium.

* * * * *